(12) United States Patent
Keichler

(10) Patent No.: US 6,805,160 B1
(45) Date of Patent: Oct. 19, 2004

(54) PUMP INTAKE FLOW CONTROL

(76) Inventor: William H. Keichler, 1030 S. Dobson #278, Mesa, AZ (US) 85202

( * ) Notice: Subject to any disclaimer, the term of this patent is extended or adjusted under 35 U.S.C. 154(b) by 72 days.

(21) Appl. No.: 10/093,732

(22) Filed: Mar. 8, 2002

(51) Int. Cl.[7] .............................................. B01D 29/39
(52) U.S. Cl. .................. 137/590; 137/533.11; 137/550; 138/41; 210/416.1; 210/460
(58) Field of Search ........................... 137/533.11, 550, 137/577, 577.5, 578, 579, 590; 138/41; 210/460, 416.1; 405/127

(56) References Cited

U.S. PATENT DOCUMENTS

| | | | |
|---|---|---|---|
| 857,519 A | * | 6/1907 | Foster .......................... 137/590 |
| 1,329,171 A | * | 1/1920 | Garry et al. ................. 210/460 |
| 1,909,578 A | | 5/1933 | Franke |
| 2,946,345 A | * | 7/1960 | Weltmer ...................... 137/590 |
| 3,465,523 A | | 9/1969 | Clark Jr. |
| 3,478,690 A | | 11/1969 | Helke et al. |
| 3,782,416 A | * | 1/1974 | Levin .......................... 137/590 |
| 4,376,091 A | * | 3/1983 | Netkowicz et al. ......... 376/283 |
| 4,571,948 A | * | 2/1986 | Orenstein .................... 137/590 |
| 5,392,806 A | * | 2/1995 | Gallant ........................ 137/590 |
| 5,759,398 A | * | 6/1998 | Kielbowicz .............. 210/416.1 |
| 5,759,399 A | | 6/1998 | Bilanin et al. |
| 6,014,987 A | * | 1/2000 | List et al. .................... 137/590 |
| 6,179,558 B1 | | 1/2001 | Eastman, III et al. |
| 6,234,200 B1 | * | 5/2001 | Hall ............................ 137/590 |

* cited by examiner

Primary Examiner—John Rivell
(74) Attorney, Agent, or Firm—Parsons&Goltry; Robert A. Parsons; Michael W. Goltry

(57) ABSTRACT

A flow control device to be coupled to the intake of a pump including a base, an outlet plate having an outlet formed therein generally opposing the base, and a plurality of annular baffles carried between the base and the outlet plate. The annular baffles are spaced apart to define a plurality of inlets. Each of the plurality of annular baffles has an inner diameter, the inner diameters defining an interior void.

10 Claims, 4 Drawing Sheets

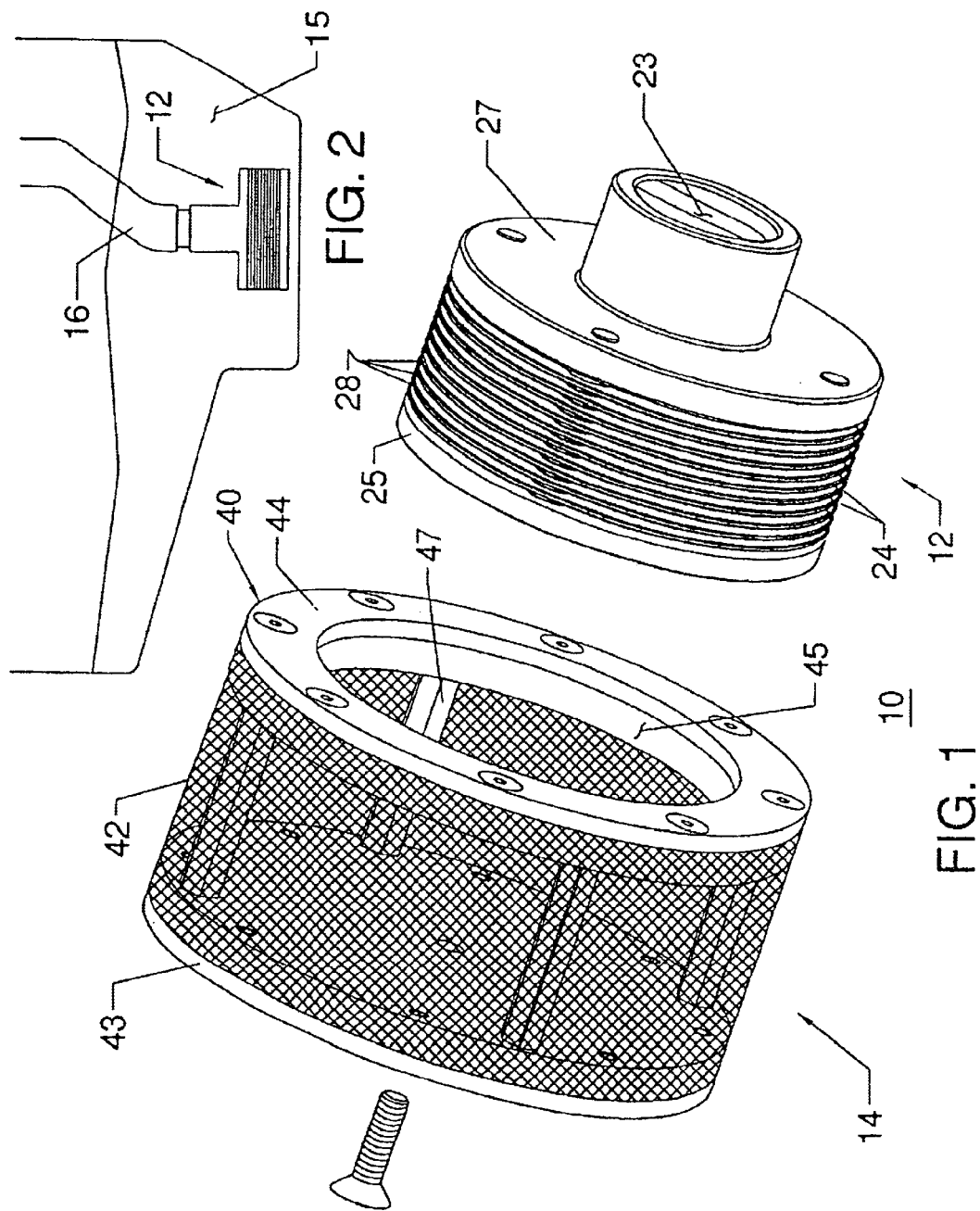

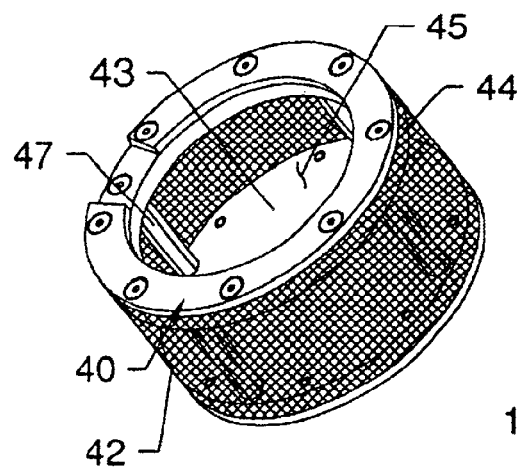
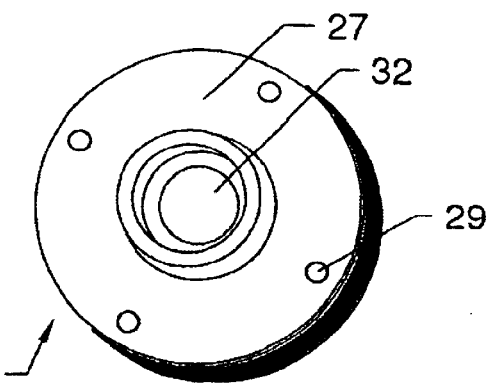
FIG. 6  FIG. 4
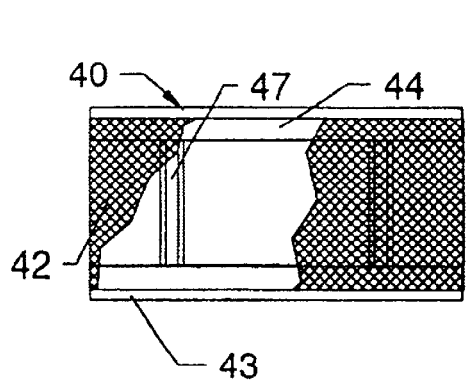
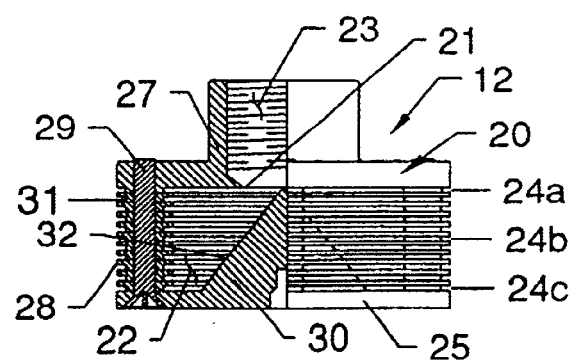
FIG. 5  FIG. 3

PUMP INTAKE FLOW CONTROL

FIELD OF THE INVENTION

This invention relates to transfer of fluids.

More particularly, the present invention relates to pumps used to transfer fluids, and control of the fluid entering the pump.

BACKGROUND OF THE INVENTION

Fluid pumps and various accessories thereto have long been known and used to transfer fluid from a reservoir. The intake for a pump typically resides in the reservoir of fluid to be transferred. Often, this reservoir of fluid contains contaminates such as sand, gravel, metal filings, sludge, etc, depending upon the fluid and the particular use. Foreign matter in the reservoir can be drawn into the pump, causing reduced pumping efficiency, reducing flow rate, and/or damaging the pump mechanism. Fluid being drawn into the inlet typically travels at a high velocity, resulting in the production of currents in the reservoir. The currents stir up the particles and other foreign matter in the reservoir, which in effect, keeps them in suspension. Thus, when the fluid is drawn into the inlet, much of the particulate or other foreign material is also drawn into the inlet and the pump.

In an attempt to prevent particulate matter in the reservoir from entering the pump mechanism, screens or cages are often carried at the inlet for the pump. While somewhat effective for larger particles, they are not as effective as desired, and can present serious drawbacks. Screens or cages with apertures small enough to screen small particles will often clog. This will also occur in screens with larger apertures also. Furthermore, the cages or screens have no effect on the currents and eddies formed in the reservoir by the intake of fluids and thus particulate matter is still agitated within the fluid.

It would be highly advantageous, therefore, to remedy the foregoing and other deficiencies inherent in the prior art.

Accordingly, it is an object of the present invention to provide a new and improved device for limiting particulate matter entering a pump.

Another object of the invention is to provide a device easily attachable to the intake of a pump.

And another object of the invention is to provide a device for controlling the flow of fluid into an intake of a pump.

SUMMARY OF THE INVENTION

Briefly, to achieve the desired objects of the instant invention in accordance with a preferred embodiment thereof, provided is a flow control device for controlling the flow of a fluid into the intake of a pump. The device including a housing defining an interior void, an outlet defined by the housing and couplable to an intake of a pump, and a plurality of inlets defined by the housing and encircling the interior void. The plurality of inlets is disposed at an angle to the outlet.

In another embodiment, the housing includes a base, an outlet plate having the outlet formed therein, and a plurality of annular baffles carried between the base and the outlet plate. The annular baffles are spaced apart to define the plurality of inlets. In yet another embodiment, a buffer member is centrally positioned within the void and has a surface substantially opposing the plurality of inlets for facilitating redirection of fluid entering the inlets to the outlet.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 1 is a partially exploded perspective view illustrating a flow control device and associated screen assembly according to the present invention;

FIG. 2 is a side view illustrating the flow control device of FIG. 1, as it appears coupled to a pump intake in a reservoir;

FIG. 3 is a side plan of the flow device with portions cut away;

FIG. 4 is a top plan view of the flow device of FIG. 3;

FIG. 5 is a side view illustrating a screen assembly with portions cut away;

FIG. 6 is a top plan view of the screen assembly of FIG. 5;

DETAILED DESCRIPTION OF THE PREFERRED EMBODIMENT

Figure 7:
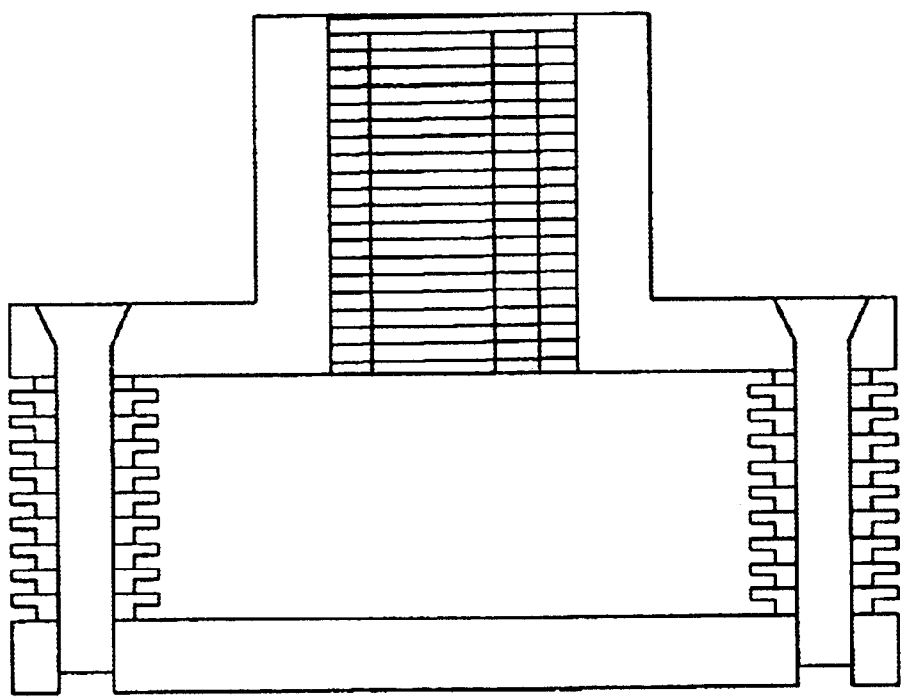
FIG. 7 is another embodiment of a flow device according to the present invention.

Turning now to the drawings in which like reference characters indicate corresponding elements throughout the several views, attention is first directed to FIG. 1 which illustrates a pump intake assembly generally designated 10. Pump intake assembly 10 in this embodiment includes a flow control device 12 and screen assembly 14. It will be understood from the following description that flow control device 12 can be employed with or without screen assembly 14 as desired. With momentary reference to FIG. 2, flow control device 12 is illustrated within a reservoir 15 and coupled to an intake 16 of a pump (not shown).

Referring back to FIG. 1, with additional reference to FIGS. 3 and 4, flow control device 12 includes a housing 20 defining an interior void 22, an outlet 23 defined by housing 20 and a plurality of inlets 24 defined by housing 20 and encircling interior void 22 at an angle to outlet 23. The preferred angle of the disposition of inlets 24 is substantially perpendicular to outlet 23. In the embodiment illustrated, housing 20 is generally cylindrical and includes a base 25, an outlet plate 27 having outlet 23 formed therein, and a plurality of annular baffles 28 carried between base 25 and outlet plate 27. Annular baffles 28 are spaced apart to form inlets 24 therebetween and have inner diameters which define interior void 22. Annular baffles 28 are held in position and all of the elements of housing 20 are secured by bolts 29 extending concurrently through plate 27, annular baffles 28 and base 25. Spacing of baffles 28 can be maintained by spacers 31 carried by bolts 29 between each baffle, similar to washers. Additionally spacers 31 can be formed as a unitary portion of each baffle. One skilled in the art will understand that other methods of forming housing 20 may be employed, such as machining from a unitary piece, molding in one or more pieces, etc.

Flow control device 12 is positioned within reservoir 15 with outlet 23 coupled to intake 16 of a pump. Fluid within reservoir 15 is pulled by the pump through flow control device 12 into intake 16. The velocity of the fluid being withdrawn from reservoir 15 is reduced by the increased and diffuse area of inlets 24. By creating a very diffuse area of intake of fluid around the periphery of housing 20, the velocity of the fluid is reduced while maintaining or increasing the volume of fluid being drawn into the pump. By drawing the fluid through inlets 24 which are substantially perpendicularly to outlet 23 and intake 16, greater diffusion of the pulling force of the pump is achieved, and sediment and other particulate matter is not drawn directly off the bottom of the reservoir. In this manner, the efficiency of the pump is maintained or even increased because fluid flow will be unobstructed. The reduced velocity of the drawn fluid prevents particulate matter from being held in suspension. The particulate matter will settle to the bottom of reservoir 15 and will not be disturbed by eddies, vortexes, currents, etc, caused by high velocity pump suction.

Figure 8:
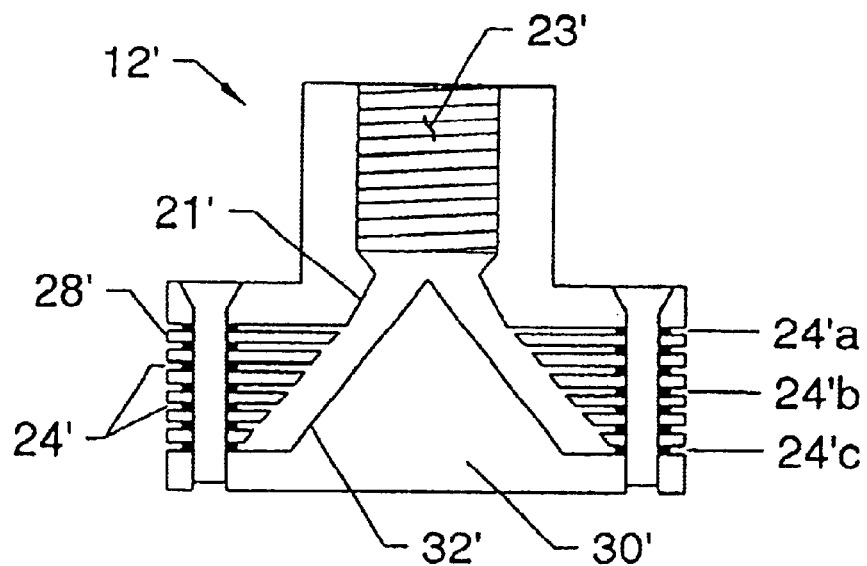
FIG. 8 is yet another embodiment of a flow device according to the present invention.

To facilitate control of drawn fluid, a conical member 30, in this embodiment, is positioned centrally within void 22 and has an outer surface 32. Cone member 30 has a surface substantially opposing inlets 24 to facilitate redirection of drawn fluid and prevent turbulence from occurring in the fluid within void 22, and facilitates a smooth transition from a fluid flow in a generally horizontal and radially inward direction to a fluid flow perpendicular thereto, through outlet 23 and into intake 16. It should be understood that while flow control device 12 is illustrated with base 25 oriented below plate 27, substantially any orientation of housing 20 is possible. It should further be understood that while a central buffer such as cone member 30 can be used, the buffer member can be omitted as illustrated in FIG. 7, or have a different shape, such as frusto-conical, faceted, etc. If the buffer member is omitted from void 22, some turbulence may develop within flow control device 12, but the velocity of the drawn fluid is lowered, reducing the particulate matter drawn into the pump. Additionally, further reduction of turbulence and increased uniformity of the flow profile across the baffles can be achieved by flaring the base of outlet 23, similar to that shown in FIG. 8, to greater or lesser degrees.

Control of the fluid being drawn into flow control device 12 can be further affected or altered by altering the diameter or spacing of annular baffles 28. Increasing the diameter of baffles 28 can result in increased inlet area with a resulting reduction in fluid velocity, while altering the spacing of baffles 28 can alter the flow characteristics into and through flow control device 12. In the present embodiment, baffles 28 all have substantially identical inner diameters. However, the inner diameters may also be varied as can be seen with reference to FIG. 8. In this embodiment, a flow control device designated 12' and having baffles 28' includes the inner diameter of baffles 28' being configured to maintain an equal distance from a surface 32' of a cone 30'. Additionally, in the embodiment illustrated in FIG. 3, cone 30' extends into an outlet 23'. The various configurations can be employed to adjust the flow of fluid equally through each of the inlets, or more flow through the upper inlets and less flow through the bottom inlets. Substantially unlimited variations are possible.

Referring again to FIG. 2, with additional reference to FIGS. 5 and 6, screen assembly 14 is illustrated. Screen assembly 14 includes a frame 40 supporting a screen member 42. Frame 40 with screen member 42 coupled to an outer periphery thereof are generally cylindrical and define a volume sized to receive flow control device 12 therein. Frame 40 has a base 43 and an access ring 44. Access ring 44 defines an opening 45 of sufficient diameter to receive flow control device 12 therethrough, and is spaced from and coupled to base 43 by a plurality of posts 47. Base 43 and ring 44 are each formed of two parts coupled together by a plurality of screws. The two parts clamp together to secure edges of screen member 42, holding screen member 42 in a position encircling frame 40. While screen member 42 is clamped between elements of base 43 and ring 44, it will be understood that fasteners such as clips, screws, takes, adhesive, etc. may be used to secure screen member 42 to frame 40. With flow control device 12 in position, ring 44 closely lies about plate 27, effectively preventing drawn fluid from entering. Screen assembly 14 can be used to remove any particles that may remain in suspension. It will be understood that screen assembly 14 can also be fabricated in a single piece such as molded from plastic, etc.

Figure 9:
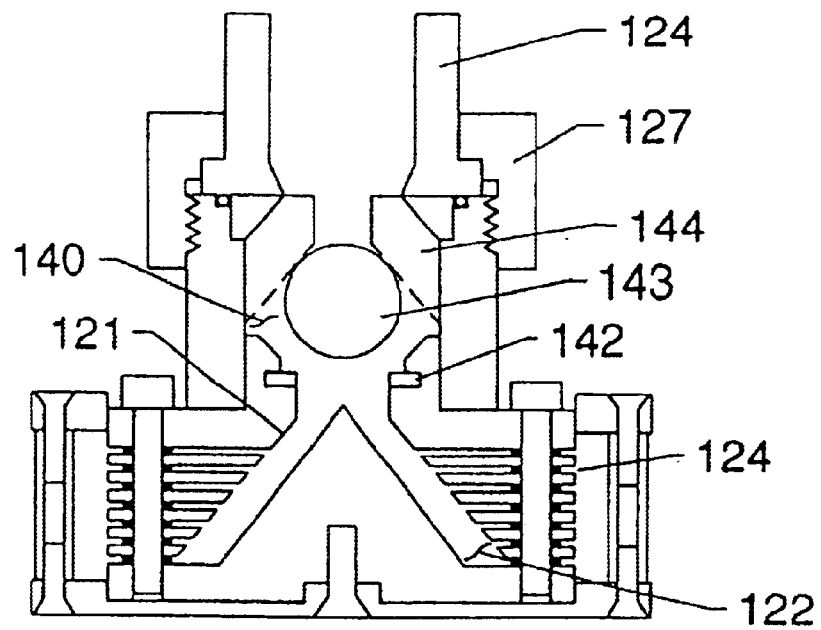
FIG. 9 is a further embodiment of a flow device according to the present invention incorporating a check valve.

Other embodiments including additional features can be employed as well. With reference to FIG. 9, another embodiment of a flow control device generally designated 112 is illustrated. Device 112 is substantially identical to device 12 including a housing 120 defining an interior void 122, an outlet 123 defined by housing 120 and a plurality of inlets 124 defined by housing 120 and encircling interior void 122. Device 112 differs in that it includes a check valve 140 carried within outlet 123. Outlet 123 is divided into an upper section 124 and a lower section 125, coupled by a coupling member 127. Check valve 140 is carried in lower section 123 and includes a valve seat 142 sealable by a ball 143, and stops 144 preventing ball 143 from exiting lower section 123. Check valve 140 is employed to prevent fluid from entering the reservoir from the pump.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A flow control device for controlling the flow of a fluid into the intake of a pump, comprising:

a housing defining an interior void and having a base plate, an outlet plate and a plurality of annular baffles carried between the base and the outlet plate, each of the plurality of annular baffles has an inner diameter, the inner diameters defining the interior void;

an outlet defined by the outlet plate and couplable to an intake of a pump;

a plurality of inlets defined by the plurality of annular baffles of the housing and encircling the interior void, the plurality of inlets being disposed at an angle to the outlet;

a buffer member centrally positioned within the void and having a surface substantially opposing the plurality of inlets for facilitating redirection of fluid entering the inlets to the outlet, the buffer member having a cone shape with an apex directed toward the outlet; and the inner diameters of the annular baffles are each configured to maintain a substantially equal distance from the cone.

2. A flow control device as claimed in claim 1 further including a screen assembly for receiving the housing therein, and having a frame supporting a screen member.

3. A flow control device couplable to the intake of a pump, comprising:

a base;

an outlet plate having an outlet formed therein generally opposing the base and couplable to the intake of a pump;

a plurality of annular baffles carried between the base and the outlet plate, the annular baffles being spaced apart to define a plurality of inlets;

each of the plurality of annular baffles having an inner diameter, the inner diameters defining an interior void; and a buffer member centrally positioned within the void and having a surface substantially opposing the plurality of inlets for facilitating redirection of fluid entering the inlets to the outlet.

4. A flow control device as claimed in claim 3 wherein the buffer member has a cone directed toward the outlet.

5. A flow control device as claimed in claim 4 wherein the inner diameters of the annular baffles are each configured to maintain a substantially equal distance from the cone.

6. A flow control device as claimed in claim 3 further including a screen assembly for receiving the housing therein, and having a frame supporting a screen member.

7. A flow control device as claimed in claim 3 further including a check valve formed in the outlet of the outlet plate.

8. A flow control device comprising:

a reservoir containing a fluid;

a pump having an intake;

a housing defining an interior void and positioned within the reservoir, the housing including a base plate, an outlet plate and a plurality of annular baffles carried between the base and the outlet plate, each of the plurality of annular baffles has an inner diameter, the inner diameters defining the interior void;

an outlet defined by the outlet plate and coupled to the intake of the pump; and a plurality of inlets defined by the plurality of annular baffles of the housing and encircling the interior void, the plurality of inlets being at an angle to the outlet;

a buffer member centrally positioned within the void and having a surface substantially opposing the plurality of inlets for facilitating redirection of fluid entering the inlets to the outlet, the buffer member having a cone shape with an apex directed toward the outlet; and the inner diameters of the annular baffles are each configured to maintain a substantially equal distance from the cone.

9. A flow control device as claimed in claim 8 further including a screen assembly for receiving the housing therein, and having a frame supporting a screen member.

10. A flow control device as claimed in claim 3, wherein the outlet is outwardly flared to form an edge meeting the void.

* * * * *